United States Patent [19]

Ohkata

[11] Patent Number: 4,570,852
[45] Date of Patent: Feb. 18, 1986

[54] DRAIN VALVE

[75] Inventor: Ichizo Ohkata, Yokohama, Japan

[73] Assignee: Kato Hatsujo Kaisha, Ltd., Kanagawa, Japan

[21] Appl. No.: 580,638

[22] Filed: Feb. 16, 1984

[30] Foreign Application Priority Data

Jul. 6, 1983 [JP] Japan .................. 58-103871

[51] Int. Cl.⁴ ............................................. F16K 17/38
[52] U.S. Cl. ............................. 236/93 R; 236/101 R; 137/204
[58] Field of Search .............. 137/204; 236/59, 93 R, 236/101 D, 101 B; 60/527

[56] References Cited

U.S. PATENT DOCUMENTS

| | | | |
|---|---|---|---|
| 2,912,166 | 11/1959 | Domnick | 236/59 X |
| 3,237,862 | 3/1966 | Salerno et al. | |
| 3,664,582 | 5/1972 | Jackson et al. | |
| 4,325,217 | 4/1982 | Golestaneh | 60/527 |
| 4,427,149 | 1/1984 | Adachi | 236/59 |

FOREIGN PATENT DOCUMENTS 56-150680  11/1981  Japan .

Primary Examiner—Alan Cohan
Attorney, Agent, or Firm—Wenderoth, Lind & Ponack

[57] ABSTRACT

A drain valve has a construction such that ascent and descent of a drain valve head for opening and closing a discharge port are effected by a combination of two coiled springs, one of which is made of a shape memory effect alloy. The drain valve head is supported so that it is capable of ascending and descending by an inside and outside dual structure of attachment of the two springs alone. Thus, it is made possible to simplify a drain valve construction and to miniaturize a drain valve per se.

1 Claim, 4 Drawing Figures

DRAIN VALVE

BACKGROUND OF THE INVENTION

1. Field of the Invention

The present invention relates to a drain valve for use in steam heating, etc.

2. Description of the Prior Art

In a diesel locomotive running in a cold region, for example, steam heating is generally adopted from structural and economic points of view. A number of drain valves for discharging steam condensate are installed at suitable positions along a steam flow tube at regular intervals. A prior art drain valve of this type is accommodated within a hollow valve casing communicating with the aforementioned steam flow tube and comprises a drain valve head for opening or closing a discharge port formed in the lower portion of the valve casing, a guide cylinder for supporting a drain valve stem so that it is capable of ascending or descending, a large-sized valve body which retains the guide cylinder on the upper portion thereof and has a plurality of vents formed in the side portion thereof, and stainless steel bellows attached between the drain valve head and the guide cylinder within the valve body. The bellows, change and cause the drain valve head to descend to automatically stop up the discharge port when the interior of the valve casing is brought to a high-temperature state with steam and, to the contrary, when part of the steam becomes cold and converts into condensate and the condensate flows into the valve body to bring the interior of the valve body to a low-temperature state, the bellows contract and cause the drain valve head to ascend to automatically open the discharge port, with the result that the condensate is spontaneously discharged out of the valve body through the discharge port.

However, since the bellows which cause the drain valve head to ascend or descend by utilization of a temperature difference has a construction such that it has gas sealed therein and undergoes stretching and contracting, there is a fair possibility of the gas escaping from the bellows to considerably lower the stretching and contracting functions of the bellows. This brings about disadvantages in that the opening or closing of the discharge port is impeded, that an auxiliary valve is additionally required to install for the purpose of supplementing the impediment, and that the durability is inferior due to its own structure. Further, since the bellows per se is very expensive, it is confirmed that use of the bellows poses a problem from an aspect of the manufacturing cost conjointly with the inferior durability of the bellows. Furthermore, the valve body is required to have a size large enough to accommodate therein the drain valve head, guide cylinder, and bellows as described above and, therefore, the inside structure is made complicated.

SUMMARY OF THE INVENTION

The main object of the present invention is to provide a drain valve exhibiting enhanced durability by eliminating the conventional disadvantage in that the stretching and contracting functions of the bellows for causing a drain valve head to descend and ascend are diminished due to gas escape. The present invention achieves a simple inside structure by making it unnecessary to use the conventionally used large-sized valve body and guide cylinder. The invention is also inexpensive to manufacture.

To attain the object as described above, according to the present invention, there is provided a drain valve which has a construction such that ascent and descent of a drain valve head for opening and closing a discharge port are carried out by a combination of a coiled compression spring made of a shape memory effect alloy such as disclosed in Japanese Patent Public Disclosure No. 56-150680, and a coiled tension spring and that the drain valve head is supported so that it is capable of ascending and descending within a valve casing by means of attaching structure of the two springs without causing a conventional valve body.

The aforementioned object, features and advantages of the present invention will become apparent from the following description given in detail with reference to the accompanying drawings.

DESCRIPTION OF THE PREFERRED EMBODIMENTS

Figure 1:
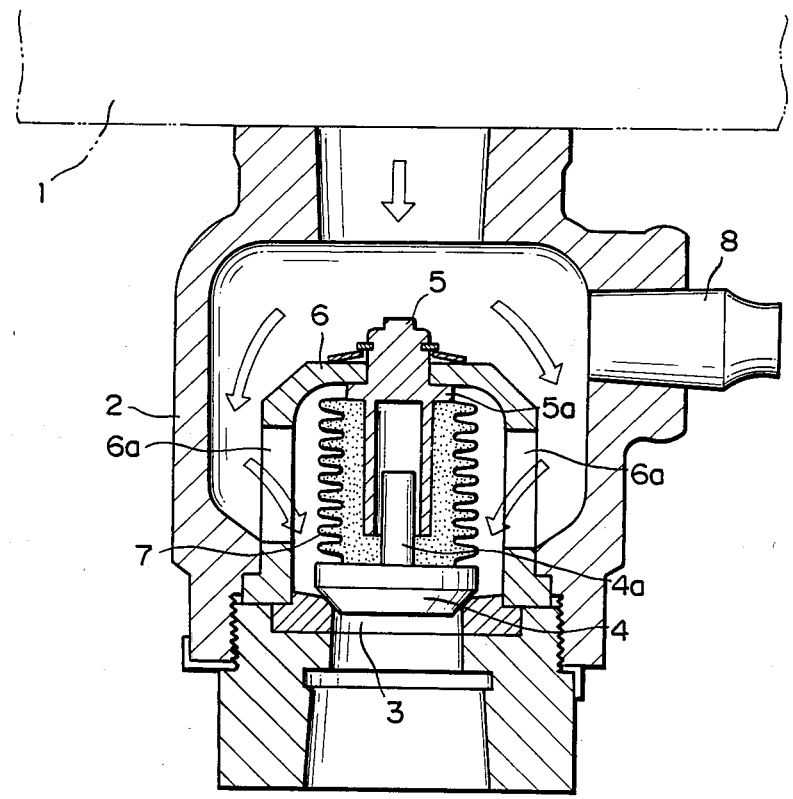
FIG. 1 is a cross-sectional view illustrating a prior art drain valve in its closed state.

FIG. 1 illustrates a prior art drain valve, which is accommodated within a hollow valve casing 2 communicating with a steam flow tube 1 and comprises a drain valve head 4 for opening or closing a discharge port 3 formed in the lower portion of the valve casing 2, a guide cylinder 5 for supporting a drain valve stem 4a capable of ascending or descending, a large-sized valve body 6 which retains the guide cylinder 5 on the upper portion thereof and has a plurality of vents 6a formed in the side portion thereof, and stainless steel bellows 7 disposed within the valve body 6 and attached between a flange 5a of the guide cylinder 5 and the drain valve head 4.

This drain valve is actuated as described hereinafter. The bellows 7 stretches and causes the drain valve head 4 to descend to automatically stop up the discharge port 3, as illustrated in FIG. 1, when the interior of the valve casing 2 is brought to a high-temperature state with steam. To the contrary, when part of the steam becomes cold and converts into condensate and the condensate flows through the valve casing 2 into the valve body 6 to bring the interior of the valve body 6 to a low-temperature state, the bellows 7 contracts and causes the drain valve head 4 to ascend to automatically open the discahrge port 3, with the result that the condensate is spontaneously discharged out of the valve body through the discharge port 3.

However, since the bellows 7 which causes the drain valve head 4 to ascend or descend by utilization of temperature difference has a construction such that it has gas sealed therein and undergoes stretching and contracting, there is a fair possibility of the gas escaping from the bellows 7 to considerably lower the stretching and contracting functions of the bellows 7. This possibility brings about disadvantages in that the opening or closing of the discharge port 3 is impeded, that an auxiliary valve 8 is additionally required to be installed for the purpose of supplementing the impediment, and that the durability is inferior due to its own structure. Further, since the bellows 7 itself is very expensive, it is confirmed that use of the bellows poses a problem from an aspect of the manufacturing cost and from an aspect of the inferior durability. Furthermore, the valve body 6 is required to have a size large enough to accommodate therein the drain valve head 4, guide cylinder 5, and bellows 7 as described above and, therefore, the inside structure is made complicated.

The present invention has been accomplished for the purpose of eliminating the aforementioned disadvantages and will be described hereinafter in detail with reference to the illustrated embodiments.

Figure 2:
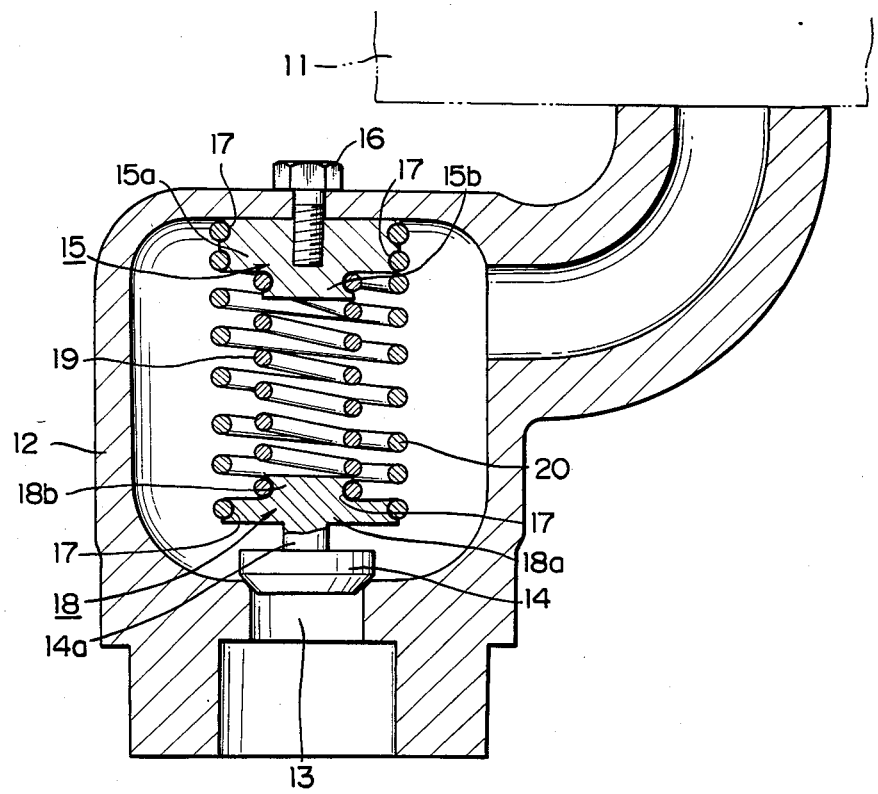
FIG. 2 is a cross-sectional view illustrating one embodiment of the drain valve in its closed state according to the present invention.
Figure 3:
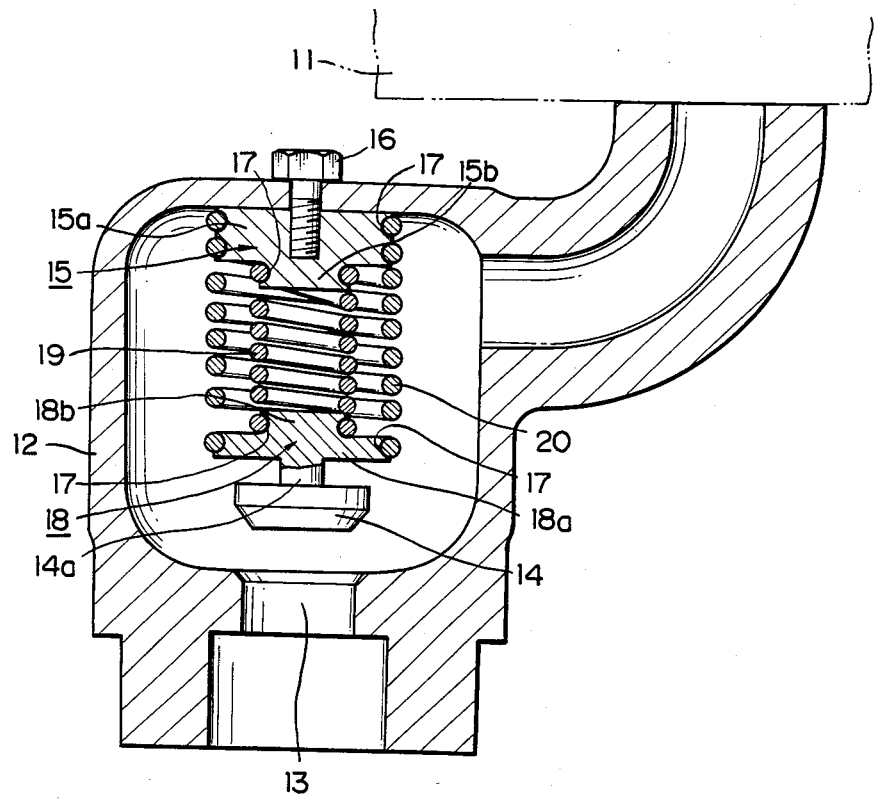
FIG. 3 is a cross-sectional view illustrating the drain valve in its open state.

FIGS. 2 and 3 are cross-sectional views showing the first embodiment of the drain valve according to the present invention. The drain valve in this embodiment is constructed, as shown, by fixing to the upper portion of a hollow valve casing 12 with a screw member 16, an upper retainer 15 comprising a large-diameter portion 15a having spring retaining grooves 17 formed in the circumference thereof and a small-diameter portion 15b having spring retaining grooves 17 formed in the circumference thereof, which portions are concentrically superposed one on top of the other. A valve stem 14a of a drain valve head 14 is provided integrally with a lower retainer 18 which comprises a large-diameter portion 18a having spring retaining grooves 17 formed in the circumference thereof and a small-diameter portion 18b having spring retaining grooves 17 formed in the circumference thereof, which portions are concentrically superposed one on top of the other, so that the upper and lower retainers 15 and 18 are opposed to each other. The opposite ends of a coiled compression spring 19 are allowed to be engaged respectively with the spring retaining grooves 17 in the opposed upper and lower small-diameter portions 15b and 18b, the coiled compression spring 19 being made of a shape memory effect alloy and serving to urge the drain valve head 14 in its closing direction, i.e. in its descending direction, under normal conditions. The opposite ends of a coiled tension spring 20 are allowed to be engaged respectively with the spring retaining grooves 17 in the opposed upper and lower large-diameter portions 15a and 18a so that the coiled tension spring 20 is biased toward the upper retainer 15, i.e. energizes the drain valve head 14 toward its ascending direction, under normal conditions.

The compression spring 19 of shape memory effect alloy is attached at the inside positions between the opposed upper and lower retainers 15 and 18, and the tension spring 20 is attached at the outside positions between the same upper and lower retainers 15 and 18. Therefore, the drain valve head 14 is held fast within the valve casing 12 by the dual structure of the spring attachment alone and is guided to ascend or descend within the valve casing 12.

The spring pressure of the coiled compression spring 19 made of a shape memory effect alloy and that of the coiled tension spring 20 in this embodiment are set so that the pressure of the compression spring 19 becomes higher than that of the tension spring 20 when the interior of the valve casing 12 is maintained at high temperatures by steam, whereas when the interior of the valve casing is brought to a low-temperature state by steam condensate, the compression spring 19 of shape memory effect alloy contracts because of the metallic property of the material and the pressure of the tension spring 20 becomes higher than that of the compression spring 19.

With the construction of the drain valve according to the present invention as described above, when part of the steam flowing within a steam flow tube 11 becomes cold converts into condensate and the condensate flows into the hollow valve casing 12 to bring the interior of the valve casing to a law-temperature state, the compression spring 19 of shape memory effect alloy contracts and has its pressure made lower than the pressure of the tension spring 20 and, therefore, the drain valve head 14 is caused to ascend with its posture supported stably by the dual structure of the spring attachment as illustrated in FIG. 3 to thereby automatically open a discharge port 13 formed in the lower portion of the valve casing 12, with the result that the condensate is spontaneously discharged out of the valve casing 12 through the discharge port 13.

After completion of the spontaneous discharge of the condensate, the interior of the valve casing 12 is brought again to a high-temperature state by means of steam. As a result, the compression spring 19 of shape memory effect alloy stretches due to the metallic property of the material and has its pressure made larger than the pressure of the tension spring 20. Therefore, the drain valve head 14 is caused to descend with its posture supported stably by the dual structure of the spring attachment as illustrated in FIG. 2 to automatically close the discharge port 13.

Figure 4:
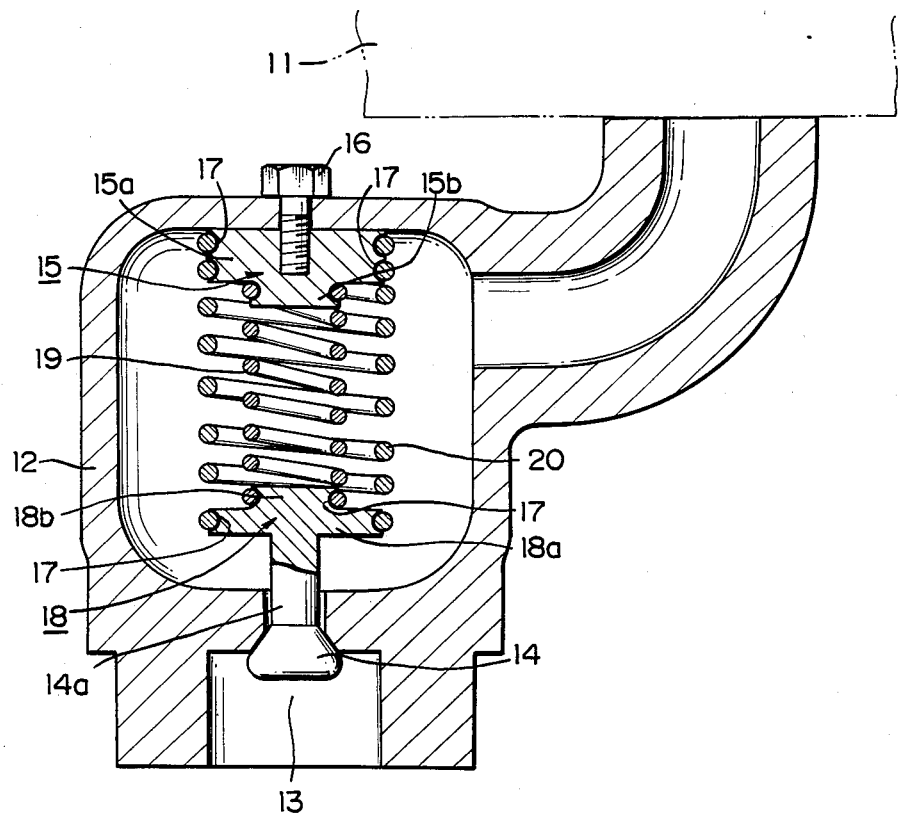
FIG. 4 is a cross-sectional view illustrating another embodiment of the drain valve in its closed state according to the present invention.

FIG. 4 is a cross-sectional view illustrating a second embodiment of the drain valve according to the present invention. The same elements as those in the first embodiment are indicated by the same reference numerals as used in FIG. 2 except that reference numeral 19 denotes a coiled tension spring which is made of a shape memory effect alloy so as to urge a drain valve head 14 in the upward direction under normal conditions and that reference numeral 20 denotes a coiled compression spring for urging the drain valve head 14 in the downward direction under normal conditions. Further, in this embodiment, the drain valve head is disposed outside the interior of the valve casing 12. Therefore, the discharge port 13 is closed when the drain valve head 14 is caused to ascend by the pressure of the tension spring 19 of shape memory effect alloy made higher than that of the compression spring 20 at the time that the interior of the valve casing 12 is held in a high-temperature state, whereas it is opened when the drain valve head 14 is caused to descend by the pressure of the compression spring 20 made higher than that of the tension spring 19 at the time that the interior of the valve casing 12 is held in a low-temperature state.

As described above, the present invention is characterized by using, in place of the conventionally used bellows, a combination of a spring made of a shape memory effect alloy for urging the drain valve head in the direction in which the discharge port is to be closed and a spring for urging the drain valve head in the direction in which the discharge port is to be opened, and causing the drain valve head to ascend or descend by the function of the combination of the springs to automatically open or shut the discharge port. Therefore, the present invention can completely eliminate the adverse phenomena of diminishing the functions of opening and closing the discharge port which have heretofore been experienced by use of the bellows which is apt to allow gas to escape. Also, the invention does not require installation of an auxiliary valve, as used in the conventional drain valve, and consequently, contributes greatly to the improvement in durability and to the reduction in manufacturing cost.

Further, since the construction is capable of retaining a drain valve head within a valve casing with the dual structure of an attachment of springs at the inside and outside positions between the upper and lower retainers, which construction does not require the guide cylinder and the large-sized valve body for retaining the guide cylinder thereon, as have heretofore been adopted, the inside structure of a drain valve is simplified and the number of steps for assemblage is reduced. Therefore, the present invention can not only attain miniaturization of a valve casing effectively but also can carry out acceleration of the opening and closing movements of the drain valve head.

What is claimed is:

1. A drain valve for a steam flow tube, comprising:
   a hollow valve casing communicating with the steam flow tube and having a discharge port formed in a lower portion thereof,
   a drain valve head with a valve stem, said drain valve head being positioned in communication with the discharge port of the hollow valve casing,
   an upper retainer fixed to an upper inner wall of said hollow valve casing and composed of a large-diameter portion having spring retaining grooves formed in a circumference thereof and a small-diameter portion having spring retaining grooves formed in a circumference thereof, said large-diameter portion being concentrically superposed on said small-diameter portion,
   a lower retainer provided integrally with said valve stem of said drain valve head and composed of a large-diameter portion having spring retaining grooves formed in a circumferene thereof and a small-diameter portion having spring retaining grooves formed in a circumference thereof, said small-diameter portion being concentrically superposed on said large-diameter portion,
   said upper retainer and said lower retainer being opposed to each other,
   a first spring made of a shape memory effect alloy, attached to inside positions between the opposed upper and lower retainers so as to have opposite ends of the first spring engaged in the spring retaining grooves in the small-diameter portions of the opposed upper and lower retainers, said first spring being adapted to urge said drain valve head in a direction in which said discharge port is to be closed, and
   a second spring attached to outside positions between the opposed upper and lower retainers so as to have its opposite ends engaged in the spring retaining grooves in the large-diameter portions of the opposed upper and lower retainers, said second spring being adapted to urge said drain valve head in a direction in which said discharge port is to be opened,
   whereby said discharge port is automatically closed or opened by causing said drain valve head to ascend or descend by temperature differences which affect the first spring and the second spring to react in opposite directions within said hollow valve casing.

* * * * *